United States Patent
Hong

(10) Patent No.: US 9,911,947 B2
(45) Date of Patent: Mar. 6, 2018

(54) BATTERY CELL FOR ELECTRONIC DEVICE

(71) Applicant: SAMSUNG SDI CO., LTD., Yongin-si, Gyeonggi-do (KR)

(72) Inventor: Sung-Ho Hong, Suwon-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 617 days.

(21) Appl. No.: 14/483,818

(22) Filed: Sep. 11, 2014

(65) Prior Publication Data

US 2015/0072223 A1    Mar. 12, 2015

(30) Foreign Application Priority Data

Sep. 11, 2013 (KR) .................. 10-2013-0108795

(51) Int. Cl.
  *H01M 2/08* (2006.01)
  *H01M 2/02* (2006.01)
  *H01M 2/10* (2006.01)
  *H01M 10/04* (2006.01)

(52) U.S. Cl.
  CPC ....... *H01M 2/0207* (2013.01); *H01M 2/1016* (2013.01); *H01M 2/1061* (2013.01); *H01M 10/0436* (2013.01); *H01M 2220/30* (2013.01)

(58) Field of Classification Search
  CPC ............. H01M 2/0207; H01M 2/1016; H01M 2/1061; H01M 2/1066; H01M 10/0436
  See application file for complete search history.

(56) References Cited

U.S. PATENT DOCUMENTS

| 4,455,357 A * | 6/1984 | Rorer | H01M 2/0242 29/623.1 |
| 2001/0051298 A1* | 12/2001 | Hanafusa | H01M 2/0207 429/162 |
| 2005/0089751 A1* | 4/2005 | Oogami | H01M 2/1061 429/162 |
| 2005/0136324 A1 | 6/2005 | Yamada et al. | |
| 2006/0073383 A1 | 4/2006 | Han et al. | |

(Continued)

FOREIGN PATENT DOCUMENTS

| JP | 2001-083896 A | 3/2001 |
| JP | 2001-266826 A | 9/2001 |

(Continued)

*Primary Examiner* — Jimmy Vo
(74) *Attorney, Agent, or Firm* — Lee & Morse, P.C.

(57) ABSTRACT

A battery cell for an electronic device, and an electronic device, the battery cell including an electrode assembly; an outer case accommodating the electrode assembly, the outer case including first and second outer cases that contact each other along edges thereof, wherein the first and second outer cases include a body portion that includes a space for accommodating the electrode assembly therein, and a wing portion on at least a part of an outer circumference of the body portion, the wing portion including at least one through-hole therein; an insulating film is folded along a length direction of the wing portion to surround the wing portion, the insulating film including a hole at a position overlying the at least one through-hole of the wing portion; and a plate-shaped ring-type insulating member around a circumference of the at least one through-hole.

19 Claims, 9 Drawing Sheets

(56) References Cited

U.S. PATENT DOCUMENTS

| | | | |
|---|---|---|---|
| 2006/0286450 A1* | 12/2006 | Yoon | H01M 2/021 |
| | | | 429/180 |
| 2008/0248377 A1* | 10/2008 | Hashida | H01M 2/1016 |
| | | | 429/99 |
| 2008/0292956 A1 | 11/2008 | Hong et al. | |
| 2012/0034514 A1 | 2/2012 | Baek | |
| 2012/0155001 A1 | 6/2012 | Fujikawa et al. | |
| 2012/0189873 A1 | 7/2012 | Park | |
| 2014/0106193 A1* | 4/2014 | Kim | H01M 2/22 |
| | | | 429/94 |

FOREIGN PATENT DOCUMENTS

| | | | | |
|---|---|---|---|---|
| JP | 2005-166644 A | 6/2005 | | |
| JP | 2012-226826 A | 11/2012 | | |
| JP | 2013-041788 A | 2/2013 | | |
| KR | 11-065762 A | 3/1999 | | |
| KR | 2005-0046636 A | 5/2005 | | |
| KR | 2006-0010652 A | 2/2006 | | |
| KR | 10-0864887 B | 10/2008 | | |
| KR | 2012-0021577 A | 3/2012 | | |
| KR | 2012-0042537 A | 5/2012 | | |
| KR | 2012-0099163 A | 9/2012 | | |
| KR | 2013-0030723 A | 3/2013 | | |
| WO | WO 2013042948 A2 * | 3/2013 | | H01M 2/22 |

* cited by examiner

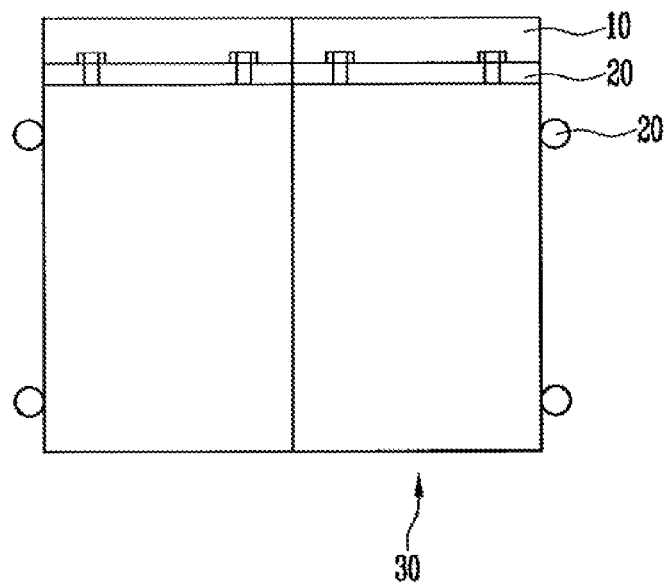
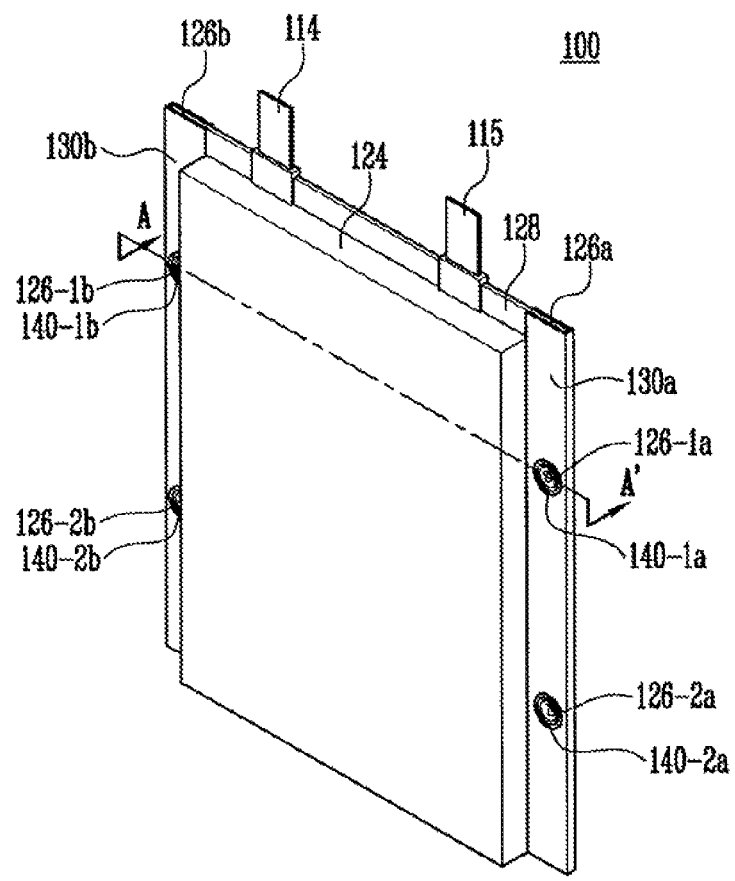

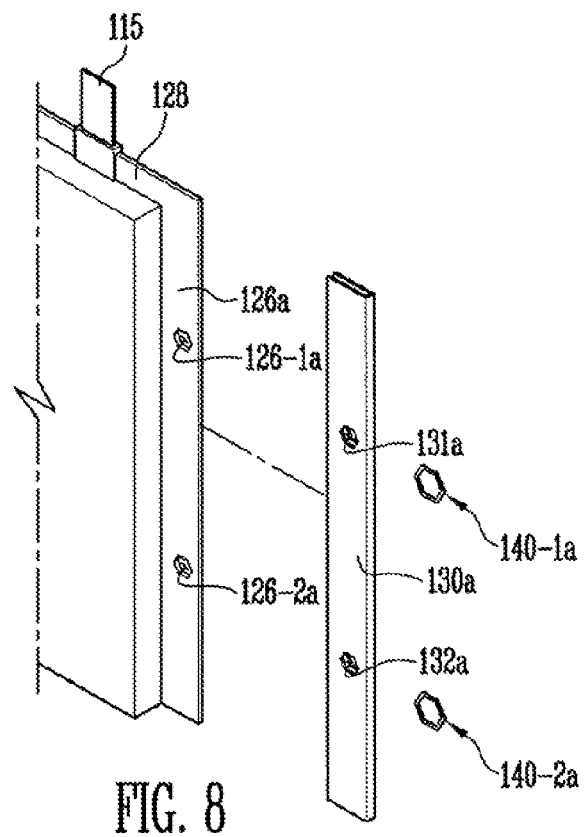
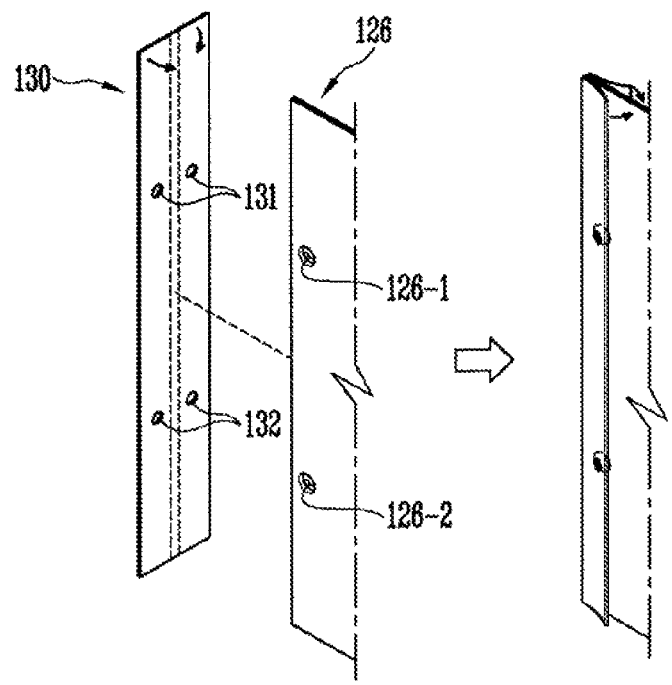

BATTERY CELL FOR ELECTRONIC DEVICE

CROSS-REFERENCE TO RELATED APPLICATION

Korean Patent Application No. 10-2013-0108795, filed Sep. 11, 2013, in the Korean Intellectual Property Office, and entitled: "Battery Cell For Electronic Device," is incorporated by reference herein in its entirety.

BACKGROUND

1. Field

Embodiments relate to a battery cell for an electronic device.

2. Description of the Related All

Unlike primary batteries that cannot be charged, secondary batteries refer to batteries that can he charged/discharged. The secondary batteries are widely used in fields of compact electronic devices such as cellular phones, PDAs, notebook computers, and tablet PCs.

SUMMARY

Embodiments are directed to a battery cell for an electronic device.

The embodiments may be realized by providing a battery cell for an electronic device, the battery cell including an electrode assembly; an outer case accommodating the electrode assembly, the outer case including first and second outer cases that contact each other along edges thereof, wherein the first and second outer cases include a body portion that includes a space for accommodating the electrode assembly therein, and a wing portion on at least a part of an outer circumference of the body portion, the wing portion including at least one through-hole therein; an insulating film is folded along a length direction of the wing, portion to surround the wing portion, the insulating film including a hole at a position overlying the at least one through-hole of the wing portion; and a plate-shaped ring-type insulating member around a circumference of the at least one through-hole.

The battery cell may be installable in the electronic device by a fastener that is fastened to an internal frame, of the electronic device and that passes through the plate-shaped ring-type insulating member, the hole of the insulating film, and the at least one through-hole.

The insulating film may surround the wing portion in a state in which the hole in the insulating film is formed, and a diameter of the hole in the insulating film is smaller than that of the at least one through-hole to thereby seal an inner circumferential surface of the at least one through-hole.

The at least one through-hole. in the wing portion, the hole in the insulating film, and the plate-shaped ring-type insulating member may have any one of a circular shape or a polygonal shape.

The at least one through-hole in the wing portion, the hole in the insulating film, and the plate-shaped ring-type insulating member may have the circular shape, and an external diameter of the plate-shaped ring-type insulating member may be greater than a diameter of the at least one through-hole.

An internal diameter of the plate-shaped ring-type insulating member may he smaller than the diameter of the at least one through-hole.

The insulating member may be made of a plastic material.

The fastener may be a bolt made of a plastic material.

The embodiments may be realized by providing, a battery cell for an electronic device, the battery cell including an electrode assembly; an outer case accommodating the electrode assembly, the outer case including first and second outer cases that contact each other along edges thereof, wherein the first and second outer cases include a body portion that includes a space for accommodating the electrode assembly therein, and a wine portion on at least a part of an outer circumference of the body portion, the wing portion including at least one through hole therein; an insulating member surrounding an inner circumferential surface of the at least one through-hole.

The battery cell may be installable in the electronic device by a fastener that is fastened to an internal frame of the electronic device and that passes through the at least one through-hole.

The insulating member may include a wall portion on the inner circumferential surface of the at least one through-hole; and a first ring-type frame portion extending from the wall portion, the first ring-type frame portion being cm one outer surface of the wing portion.

The insulating member may further include a second ring-type frame portion extending from the wall portion, the second ring-type frame portion being on another outer surface of the wing portion.

The at least one through-hole, the first ring-type frame portion, and the second ring-type frame portion may have any one of a circular shape or a polygonal shape.

The at least one through-hole, the first ring-type frame portion, and the second ring-type frame portion may have the circular shape, and an external diameter of the first or second ring-type frame portion may be greater than a diameter of the through-hole.

An internal diameter of the first or second ring-type frame portion may be smaller than the diameter of the through-hole.

The first ring-type frame portion may be symmetric to the second ring-type frame portion.

The battery cell may further include. an insulating film that is folded along a length direction of the wing portion to surround the wing portion, the insulating film including a hole at a position overlying the at least one through-hole of the wing portion.

The fastener may pass through the hole in the insulating film and the at least one through-hole.

The embodiments may be realized by providing an electronic device including the battery cell according to an embodiment; an internal frame; and a fastener, wherein the battery cell is coupled with the internal frame by a fastener that is fastened to the internal frame of the electronic, device and that passes through the plate-shaped ring-type insulating member, the hole of the insulating film, and the at least one through-hole.

BRIEF DESCRIPTION OF THE DRAWINGS

Features will be apparent to those of skill in the art by describing in detail exemplary embodiments with reference to the attached drawings in which:

FIG. 1 illustrates a view schematically showing a state in which a battery cell for an electronic device is installed in an electronic device.

FIG. 2 illustrates a perspective view of a battery cell for an electronic device according to an embodiment.

FIGS. 7A and 7B illustrate views showing through-holes of a wing portion, holes of an insulating film, and a plate-shaped ring-type insulating member according to another embodiment.

FIG. 8 illustrates a view schematically showing a state in which the insulating film surrounds the wing portion according to an embodiment.

DETAILED DESCRIPTION

Figure 3:
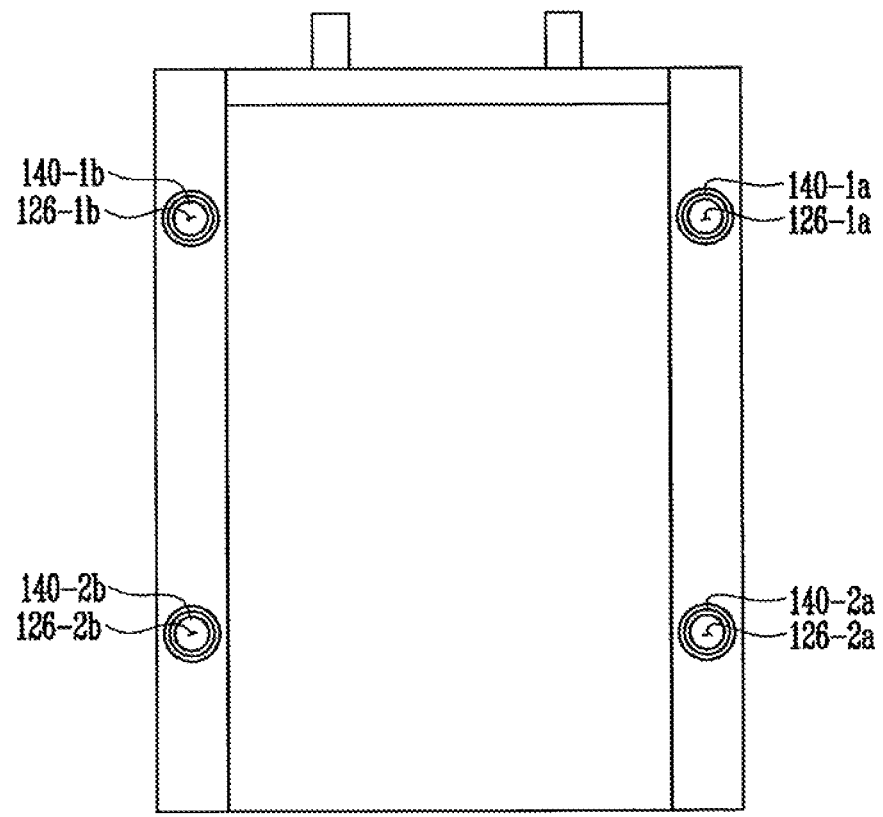
FIG. 3 illustrates a front view of the battery cell according to an embodiment.

Example embodiments will now be described more fully hereinafter with reference to the accompanying drawings; however, they may he embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween.

As shown in FIG. 1, a pouch-type secondary battery may employ a method of fixing the secondary battery to a frame in an electronic device 10 such as a tablet PC, using a separate fixing member 20, when the secondary battery is installed in the electronic device 10, or may employ a method of fixing the secondary battery in the electronic device 10, using a separate adhesive.

The method using the separate fixing member or adhesive may increase a number of processes in the manufacturing of the electronic device, which may be disadvantageous in terms of reduction in unit cost. In a case where the adhesive is used, the method may have a quality risk due to the occurrence of attachment distribution caused by a change in the size of a battery cell.

FIGS. 2 and 3 illustrate perspective and front views of a battery cell 100 for an electronic device according to an embodiment.

Figure 4:
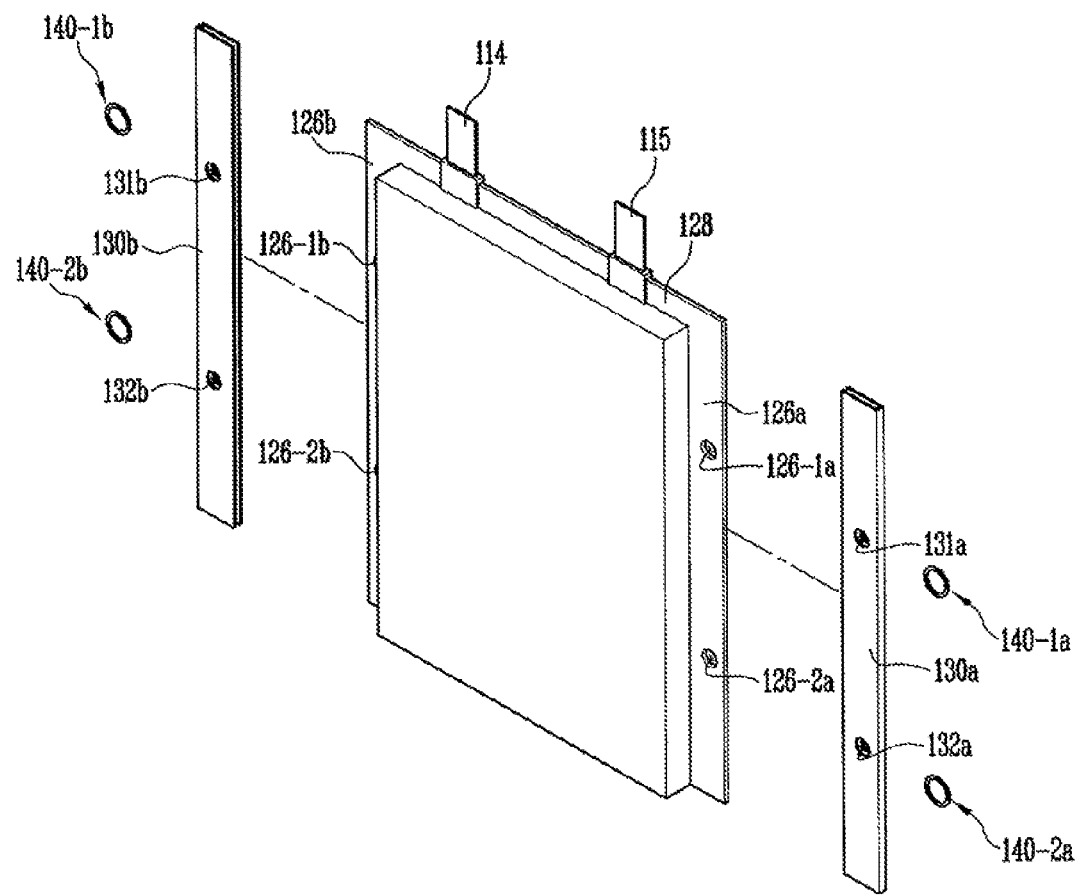
FIGS. 4 and 5 illustrate exploded, perspective views of the battery cell according to an embodiment.
Figure 5:
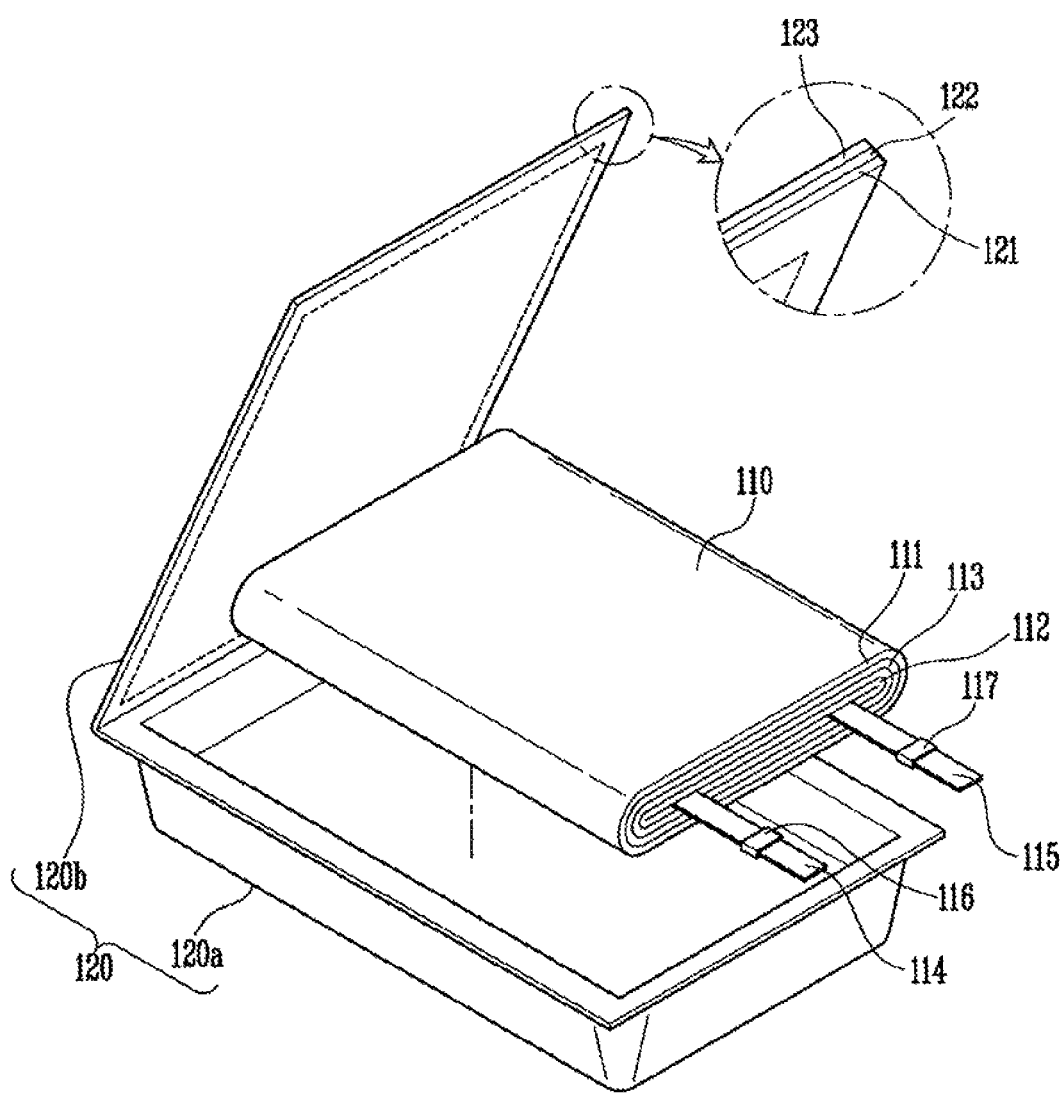

FIGS. 4 and 5 illustrate exploded perspective views of the battery cell 100 according to an embodiment.

Figure 6:
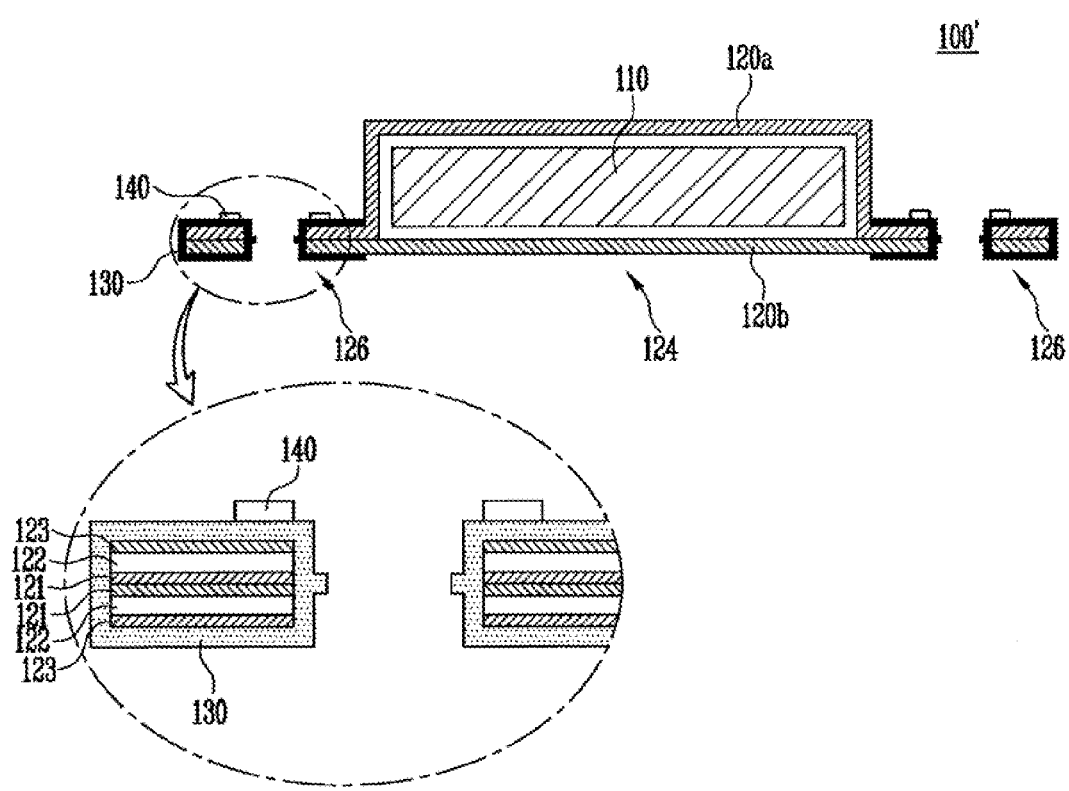
FIG. 6 illustrates a sectional view taken along line A-A' of FIG. 2.

FIG. 6 illustrates a sectional view taken along line A-A' of FIG. 2.

As shown in FIGS. 2 to 6, the battery cell 100 may include an electrode assembly 110, an outer case 120, an insulating film 130, and a plate-shaped ring-type insulating member 140.

In an implementation, and for convenience of illustration, the plate-shaped ring type insulating member 140 may have a rounded or circular shape. In an implementation, the plate-shaped ring-type insulating member 140 may have a polygonal shape, e.g., a quadrangular or hexagonal shape.

The electrode assembly 110 may include a positive electrode plate 111, a negative electrode plate 112, and a separator interposed therebetween.

The positive electrode plate 111 may include a positive electrode active material portion formed by coating a positive electrode active material on a surface of a positive electrode collector (made of, e.g., aluminum or the like), and a positive electrode non coating portion (on which the positive electrode active material is not coated). The positive electrode active material may include, e.g., a transition metal oxidoxide containing lithium, such as $LiCoO_2$, $LiNiO_2$, $LiMnO_2$ or $LiMnO_4$, or a lithium chalcogenide compound. A positive electrode tab 114 having a predetermined length may be bonded to the positive electrode non-coating portion.

The negative electrode plate 112 may include a. negative electrode active material portion formed by coating a negative electrode active material on a surface of a negative electrode collector (made of, e.g., nickel or the like), and a negative electrode non-coating portion (on which the negative electrode active material is not coated). The negative electrode active material may include, e.g., a carbon material such as crystalline carbon, amorphous carbon, carbon complex or carbon fiber, a lithium metal, a lithium alloy, or the like. A negative electrode tab 115 having a predetermined length may be bonded to the negative electrode non-coating portion.

In an implementation, the electrode assembly 110 may be manufactured by forming a stacked structure in which the separator 113 is interposed between the positive and negative electrode plates 111 and 112 and then winding the stacked structure.

The electrode assembly 110 may be electrically connected to the outside through the positive and negative electrode tabs 114 and 115. The positive electrode tab 114 may be electrically connected to the positive electrode plate 111, and the negative electrode tab 115 may be electrically connected to the negative electrode plate 112.

The positive and negative electrode tabs 114 and 115 may be provided with insulating tapes 116 and 117 for insulating the positive and negative electrode tabs 114 and 115 from upper and lower outer case 120a and 120b, respectively.

The outer case 120 according to an embodiment may accommodate the electrode assembly 110 therein, and may include upper and lower outer cases 120a and 120b.

The upper and lower outer cases 120a and 120b may contact each other along edges thereof, thereby forming a body portion 124 that includes a space in which the electrode assembly 110 is accommodated. A wing portion 126 may be formed at one or more portions or parts of an outer circumference of the body portion 124.

One or more through-holes 126-1a, 126-2a, 126-1b, and 126-2b may be formed in the wing portion 126. As will be described below, the battery cell 100 may be installed in the electronic device by a fastening portion or fastener (not shown) that is fastened to an internal frame (not shown) of the electronic device by passing through the through-holes 126-1a, 126-2a, 126-1b and 126-2b.

The fastener (not shown) may be a bolt made of a plastic material for the purpose of insulation. The fastener (not shown) may be fastened to the internal frame (not shown) of the electronic device, using a screw fastening method. The electronic device may be, e.g., a tablet PC.

In an implementation, the plate-shaped ring-type insulating member 140 may have a circular shape as described above, and the through-holes 126-1a, 126-2a, 126-1b, and 126-2b in the wing portion 126 may have a, e.g., corresponding, circular shape. As such, the plate-shaped ring-type insulating member 140 may be disposed along or around a circumference of the through-hole. In an implementation, the plate-shaped ring-type insulating member 140 may have, e.g., a polygonal shape, when the through-holes have a polygonal shape (e.g., a quadrangular or hexagonal shape).

In an implementation, the upper and lower outer cases 120a and 120b may form the body portion 124 using a method in which the upper and lower outer cases 120a and 120b are integrally bonded to each other along the edges thereof, thereby hermetically sealing the electrode assembly 110.

The space for accommodating the electrode assembly 110 therein may be formed in the lower outer case 120b by a press machining method.

In an implementation, as noted above, the space for accommodating the electrode assembly 110 therein may be formed in the lower outer case 120b, and the upper and lower outer cases 120a and 120b may be integrally bonded along the edges thereof thereby forming the body portion 124. In an implementation, a half of the body portion may be formed using a method in which the space for accommodating the electrode assembly 110 therein is formed in each of the upper and lower outer cases, and the upper and lower outer cases may be integrally bonded along the edges thereof.

The outer case 120 may have a stacked structure in order to perform a pouch function of the battery cell. For example, the outer case 120 may have a multi-layered structure including a thermal fusion layer 121 (having a thermal fusion property to act as a sealing material), a metal layer 122 (including a metal material to act as a barrier of moisture and oxygen while maintaining a mechanical strength), and an insulating layer 123.

The stacked structure may be implemented in such a manner that the thermal fusion layer 121 is formed on one surface of the metal layer 122, and the insulating layer 123 is formed on another surface of the metal layer 122.

The metal layer 122 may include, e.g., aluminum, steel, or stainless steel. The thermal fusion layer 121 may include, e.g., an olefin-based resin layer such as modified polypropylene. The insulating layer 123 may include, e.g., polyethylene terephthalate (PET) or nylon.

After the electrode assembly 110 is accommodated in the accommodating space (e.g., of the lower outer case 120b), the edges of the upper and lower outer cases 120a and 120b may be bonded using a method such as thermal fusion.

The positive and negative electrode tabs 114 and 115 may be extracted through a terrace portion 128 (which may be any one of the bonding surfaces of the upper and lower outer cases 120a and 120b). First and second wing portions 126a and 126b may be respectively provided at sides vertical or orthogonal to the terrace, portion 128.

Referring to the enlarged insets of FIGS. 5 and 6, each of the first and second wing portions 126a and 126b may be in a state in which the upper and lower outer cases 120a and 120b are overlapped with each other. The metal layer 122 may be exposed to or at end portions of the first and second wing portions 126a and 126b, or at the through-holes 126-1a, 126-2a, 126-1b, and 126-2b of the wing portions 126a and 126b.

Accordingly, in a case where an electrolyte is leaked when the battery cell is used for a long period of time, a short circuit could occur through the metal layer 122. Therefore, it may be desirable to insulate the metal layer 122.

The insulating film 130 according to an embodiment may surround the wing portion 126 inwardly from the outside in a state in which the insulating film 130 is folded along a length direction thereof. For example, the insulating film 130 may surround the wing portion 126 in order to insulate the metal layer 122, which may he exposed at or to the end portion of the wing portion 126. For example, the insulating film 130 may be folded along a length direction of the wing portion 126 to surround the wing portion 126.

In an implementation, an adhesive may be coated on one, e.g., inner, surface of the insulating film 130. The insulating film 130 may surround the wing portion 126 in such a manner that a coating surface of the adhesive may be attached to top and bottom, outer, surfaces of the wing portion 126.

Holes 131a, 132a, 131b, and 132b may be respectively formed in the insulating film 130 at positions corresponding to or overlying the through-holes 126-1a, 126-2a, 126-1b, and 126-2b, so that the battery cell IOU may be installed in the electronic device by the fastener fastened to the internal frame of the electronic device through the through-holes 126-1a, 126-2a, 126-1b, and 126-2b.

For example, the fastener (not shown) may be fastened to the internal frame of the electronic device by passing through the holes 131a, 132a, 131b, and 132b of the insulating film 130 and the through-holes 126-1a, 126-2a, 126-1b, and 126-2b in the wing portions 126, and the battery cell 100 may he installed in or fixed to the electronic device by the fastener.

The insulating film 130 according to an embodiment may surround the wing portion 126 in a state in which the holes 131a, 132a, 131b, and 132b have been previously formed, fit order to insulate the metal layer 122 (which may be exposed to or at inner circumferential surfaces of the through-holes 126-1a, 126-2a, 126-1b, and 126-2b) as the through-holes are formed in the wing portion 126. A diameter of each of the holes 131a, 132a, 131b, and 132b of the insulating film 130 may be smaller than that of each of the through-holes 126-1a, 126-2a, 126-1b, and 126-2b so that the inner circumferential surfaces of the through-holes 126-1a, 126-2a, 126-1b, and 126-2b may be hermetically sealed.

For example, the insulating film 130 may surround the wing portion 126 inwardly from the outside in the state in which the insulating, film 130 is folded along the length direction thereof in order to insulate the metal layer 122 (which may be exposed to or at the end portion of the wing portion 126), The diameter of each of the holes 131a, 132a, 131b, and 132b of the insulating film 130 may have a size such that the inner circumferential surfaces of the through-holes 126-1a, 126-2a, 126-1b, and 126-2b may be hermetically sealed in order to insulate the metal layer 122 (which may be exposed to or at the inner circumferential surfaces of the through-holes 126-1a, 126-2a, 126-1b, and 126-2b of the wing portion 126. For example, the diameter of each of the holes 131a, 132a, 131b, and 132b of the insulating film 130 may be sufficiently smaller than that of each of the through-holes 126-1a, 126-2a, 126-1b, and 126-2b. For example, a part of the insulating film 130 around the holes 131a, 132a, 131b, and 132b may be inserted, pressed, or otherwise disposed in the through-holes 126-1a, 126-2a, 126-1b, and 126-2*b* of the wing portion 126 to seal off inner circumferential sides or surfaces of the through-holes 126-1*a*, 126-2*a*, 126-1*b*, and 126-2*b* of the wing portion 126.

Accordingly, the ends of the wing portion 126 and the inner circumferential surfaces of the through-holes 126-1*a*, 126-2*a*, 126-1*b*, and 126-2*b* of the wing portion 126 (which are a portion to or at which the metal layer 122 may be exposed) may all be insulated by the insulating film 130.

Hereinafter, the configuration in which the metal layer 122 of the outer case is insulated by the insulating film 130 according to an embodiment will be described in detail with reference to FIGS. 8 and 9.

For convenience of illustration, the following description of the insulation for the metal layer may be made about any one through-hole among the plurality of through-holes 126-1*a*, 126-2*a*, 126-1*b*, and 126-2*b* and any one hole among the plurality of holes 131*a*, 132*a*, 131*b*, and 132*b* of the insulating film 130. Thus, the same description may be applied to the other through-holes and the other holes of the insulating film.

In an implementation, the through-holes of the wing portion, the holes of the insulating film, and the plate-shaped ring-type, insulating member may have a circular shape. In an implementation, as shown in FIG. 7, the through-holes of the wing portion, the holes of the insulating film, and the plate-shaped ring-type insulating member may have various shapes such as quadrangular and hexagonal shapes.

FIG. 8 illustrates a view schematically showing a state in which the insulating film 130 surrounds the wing portion 126 according to an embodiment. FIG. 9 illustrates a view showing the state in which the insulating film 130 surrounds the wing portion 126 about a through-hole 126-1 according to an embodiment.

Figure 9:
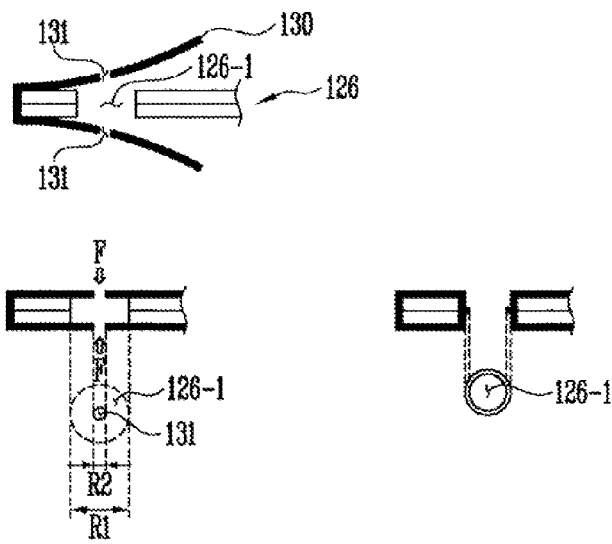
FIG. 9 illustrates a view schematically showing the state in which the insulating film surrounds the wing portion about a through-hole according to an embodiment.

As shown in FIGS. 8 and 9, the insulating film 130 may surround the wing portion 126 in the state in which the insulating film 130 is folded along the length direction thereof. For example, the insulating film 130 may be folded around ends or edges of the wing portions 126. A hole may be formed in the insulating film 130 at a position corresponding to or overlying the through-hole 126-1 of the outer case 120.

In an implementation, the insulating film 130 may surround the wing portion 126 in a state in which the hole 131 has been previously formed, in order to insulate the metal layer 122 (which may be exposed to or at an inner circumferential surface of the through-hole 126-1 of the wing portion 126). In this ease, the diameter of the hole 131 in the insulating film 130 may smaller than that of the through-hole 126-1 in order to be able to hermetically seal the inner circumferential surface of the through-hole 126-1.

For example, as shown in FIG. 9, when the insulating film 130 is attached to or coupled with the top and bottom, e.g., outer, surfaces of the wing portion 126 by an external pressure F in the state in which the insulating film 130 is folded along or around the length direction thereof, the diameter R2 of the hole 131 of the insulating film 130 may be sufficiently smaller than the diameter R1 of the through-hole 126-1, in order to be able to hermetically seal not only the end portion of the wing portion 126 but also the inner circumferential surface of the through-hole 126-1 of the wing portion 126. For example, the part of the insulating film 130 around the hole 131 may be inserted, pressed, or otherwise disposed in the through hole to seal off the inner circumferential surface of the through hole.

In an implementation, a degree to which the diameter R2 of the hole 131 of the Insulating film 130 is smaller than that R1 of the through-hole 126-1, as may be seen in FIG. 8 and FIG. 9, may be determined or selected based on a thickness of the outer case 120*a* and 120*b*.

For example, when remaining portions of the insulating film 130 (e.g., around the hole 131) in the through-hole 126-1 are as long as the thickness of the outer case, the inner circumferential surface of the through-hole 126-1 may he sufficiently sealed. Therefore, the diameter R2 of the hole 131 of the insulating film 130 may be considerably smaller than the diameter R1 of the through-hole 126-1.

In an implementation, as the thickness of the outer case is decreased, the remaining portions of the insulating film 130 (e.g., around the hole 131) in the through-hole 126-1 may sufficiently seal the inner circumferential surface of the through-hole 126-1, even though the remaining portions may be relatively short. Therefore, it may be sufficient that the diameter R2 of the hole 131 of the insulating film 130 is only slightly smaller than the diameter R1 of the through-hole 126-1.

As such, an adhesion, e.g., inner, surface of the insulating film 130 may be attached to the top and bottom, e.g., outer, surfaces of the wing portion 126, and remaining portions of the insulating film 130 (e.g., the peripheral areas of the insulating film 110 around the hole 131) may be adhered to each other (e.g., from opposite or outer sides of the insulating film 130 or the wing portion 126) in order to hermetically seal the inner circumferential surface of the through-hole 126-1.

Accordingly, it is possible to help improve the reliability of insulation for the outer ease of the battery cell 100.

In an implementation, pitches of the through-hole 126-1 of the wing portion 126 and the hole 131 of the insulating film 130 may all be determined in the process of forming the battery cell. Accordingly, it is possible to facilitate the quality management of the battery cell by ensuring a stable structure in which the battery cell is installed in the electronic device.

In an implementation, it has been illustrated in FIGS. 6 to 9 that, for convenience of illustration, the remaining portions of the insulating film 130 may be completely adhered closely to the inner circumferential surface of the through-hole 126-1. In an implementation, the remaining portions of the insulating film 130 may tot be adhered closely to the inner circumferential surface of the through-hole 126-1 within the range where the metal layer 122 can be insulated by hermetically sealing the inner circumferential surface of the through-hole 126-1.

In an implementation, referring to FIGS. 2 to 6, the plate-shaped ring-type insulating member 140 may be disposed along or around a circumference of the through-hole 126-1 of the wing portion 126 from or at the top or outer side of the insulating film 130.

The plate-shaped ring-type insulating member 140 may be made of a plastic material in order to efficiently insulate the metal layer 122, which may be exposed to the through-hole 126-1 of the wing portion 126. For example, the plate-shaped ring-type insulating member 140 may be a washer made of a plastic material.

An external diameter of the plate-shaped ring-type insulating member 140 that is disposed along the circumference of the through-hole 126-1 may be greater than the diameter of the through-hole 126-1, in order to improve the reliability of insulation for the metal layer 122. In an implementation, an internal diameter of the plate-shaped ring-type insulating member 140 may be smaller than the diameter of the through-hole 126-1.

Accordingly, when the battery cell 100 is installed in the electronic device by the fastener e.g., a plastic bolt) fastened to the internal frame of the electronic device through the plate-shaped ring-type insulating member 140, the hole 131 of the insulating film 130 and the through-hole 126-1, the insulation for the metal layer 122 may be more stably made.

Figure 7A:
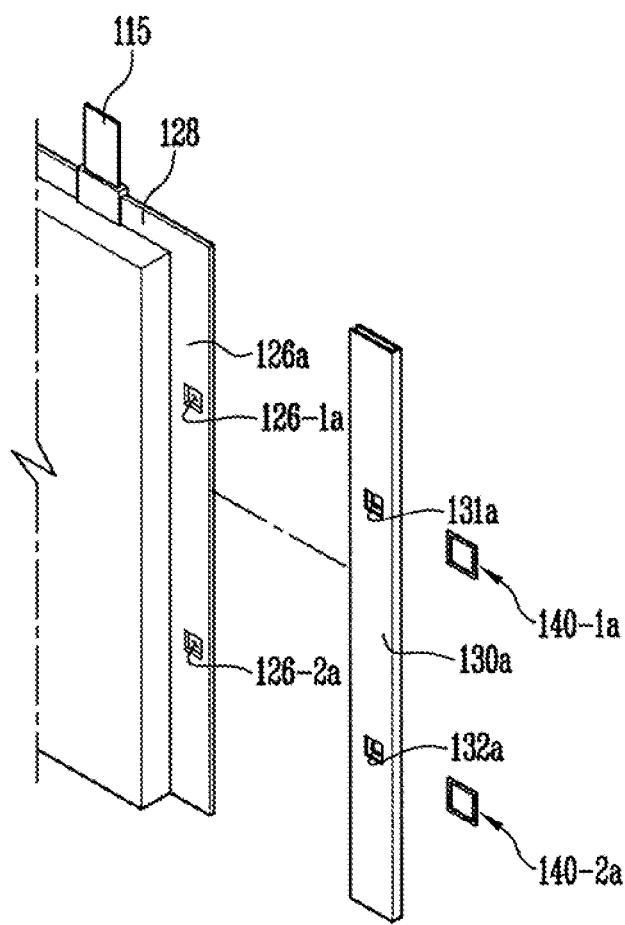

FIGS. 7A and 7B illustrate views showing through-holes of a wing portion, holes of an insulating film, and a plate-shaped ring-type insulating member according to another embodiment.

Figure 10:
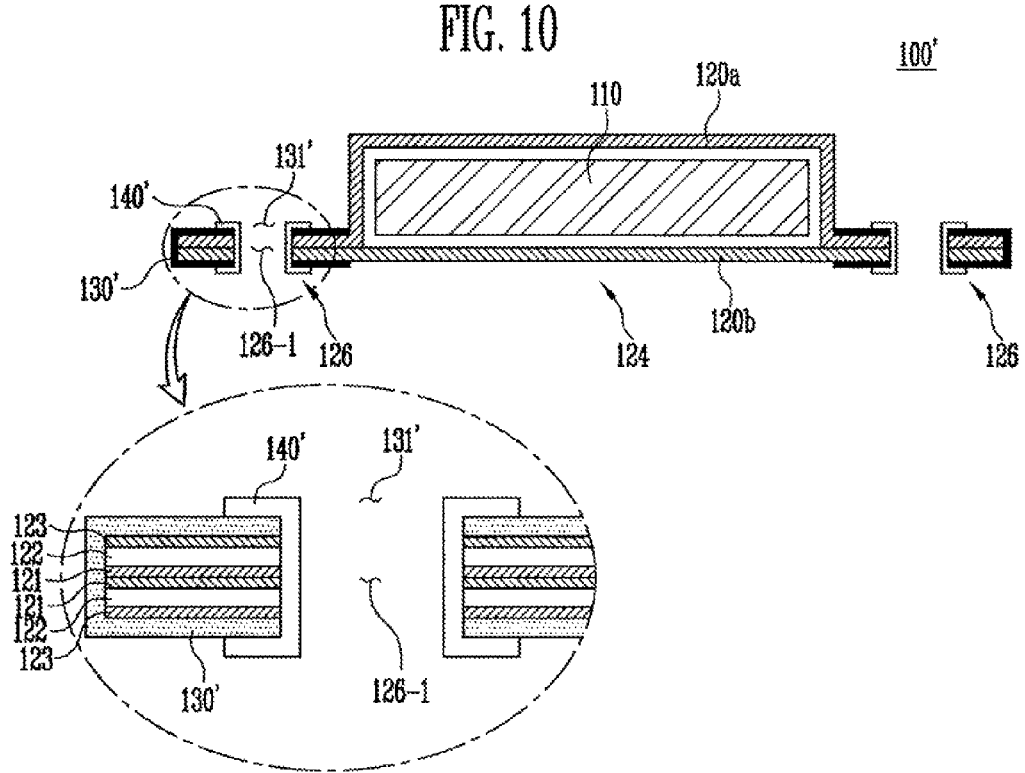
FIG. 10 illustrates a sectional view taken along line A-A' of a battery cell for an electronic device according to another embodiment.
Figure 11A:
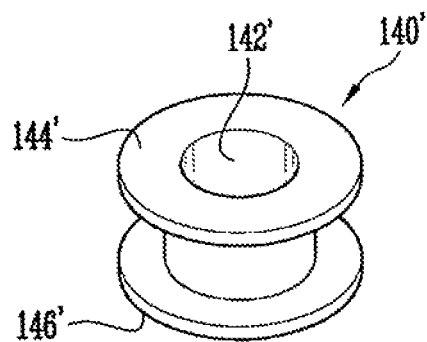
FIGS. 11A and 11B illustrate perspective and schematic sectional views of an insulating member in the battery cell according to an embodiment.
Figure 11B:
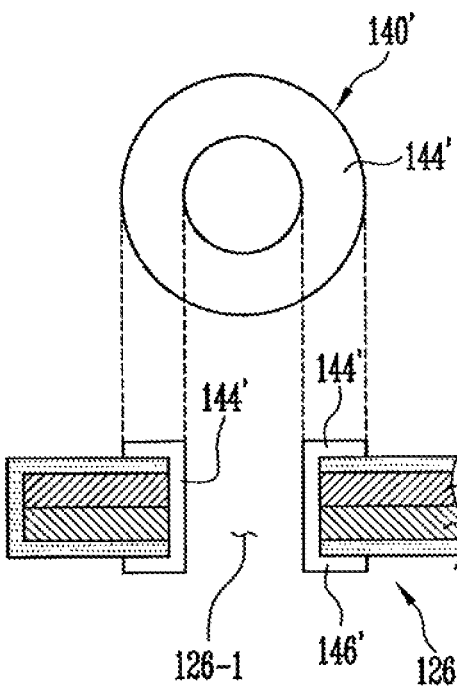
Figure 12A:
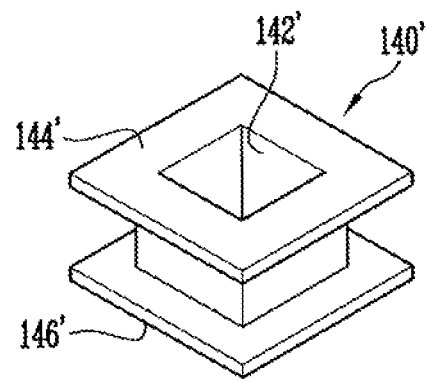
FIGS. 12A and 12B illustrate perspective views respectively showing insulating members according to other embodiments.
Figure 12B:
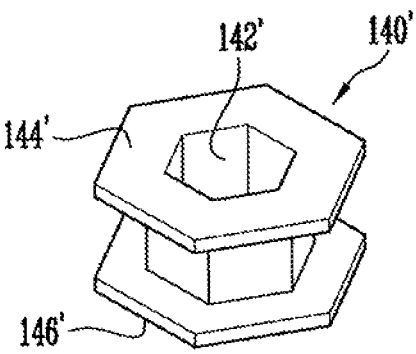

FIG. 10 illustrates a sectional view of a battery cell 100' for an electronic device taken along line A-A' of FIG. 2 according to another embodiment. FIGS. 11A and 11B illustrate perspective and sectional views of an insulating member 140' in the battery cell 100' according to an embodiment. FIGS. 12A and 12B illustrate perspective views respectively showing insulating members according to other embodiments.

As shown in FIGS. 10, 11A, and 11B, the battery cell 100' may include the electrode assembly 110, the outer case 120, an insulation film 130', and an insulating member 140'.

In this case, other components, except for those associated with the method in which the insulating film 130' surrounds the wing portion 126, and the insulating member 140' substituted for the plate-shaped ring-type insulating member 140, may all be substantially identical to those of the battery cell 100 described above. Hence, the configuration of the insulating film 130' and the insulating member 140' will be mainly described.

In an implementation, and for convenience of illustration, the insulating member 140 may have a circular shape. In an implementation, the insulating member 140', as shown in FIGS. 12A and 12B, may have as polygonal shape such as a quadrangular or hexagonal shape. In a case where the insulating member 140' has a polygonal shape, the through-holes 126-1a, 126-2a, 126-1b, and 126-2b in the wing portion 126 and holes 131'a, 132'a, 131'b, and 132'b in the insulating film 130' may have a, e.g., corresponding, polygonal shape.

In an implementation, the through-holes 126-1a, 126-2a, 126-1b, and 126-2b of the wing portion 126 may be formed after the insulating film 130' is attached to the wing portion 126.

In an implementation, the holes 131'a, 132'a, 131'b, and 132'b of the insulating film 130' may be formed at the same time as the through-holes 126-1a, 126-2a, 126-1b, and 126-2b. Accordingly, the through-holes 126-1a, 126-2a, 126-1b, and 126-2b and the holes 131'a, 132'a, 131'b, and 132'b of the insulating film 130' may have the same diameter.

The through-holes 126-1a, 126-2a, 126-1b, and 126-2b and the holes 131'a, 132'a, 131'b, and 132'b of the insulating film 130' may have the same diameter, and the battery cell 100' may include insulating members 140'-1a, 140'-2a, 140'-1b, and 140'-2b respectively surrounding and/or on the inner circumferential surfaces of the through-holes 126-1a, 126-2a, 126-1b, and 126-2b in order to insulate the metal layer 122 (which may be exposed to or at the inner circumferential surfaces of the through-holes of the wing portion 126).

For convenience of illustration, a configuration in which the insulation for the metal layer is wade about any one through-hole among the plurality of through-holes 126-1a, 126-2a, 126-1b, and 126-2b of the wing portion 126 and any one hole among the plurality of holes 131'a, 132'a, 131'b, and 132'b of the insulating film 130' will be described below. However, the same description may be applied to the other through-holes and the other holes of the insulating film.

Referring to FIG. 10, the insulating member 140' may include, e.g., a wall portion 142' and a first ring-type frame portion 144'. In an implementation, the insulating member 140' may further include and a second ring-type frame portion 146'.

For example, the insulating member 140' may include a wall portion 142' (along, on, or around the inner circumferential surface of the through-hole 126-1 of the wing portion 126), a first ring-type frame portion 144' (extending, e.g., laterally extending, from the wall portion 142' to be exposed to or on a top or one side of the wing portion 126), and a second ring-type frame portion 146' (extending, e.g., laterally extending, from the wall portion 142' to he exposed to or on the bottom or another side of the wing portion 126).

In an implementation, the insulating member 140' may he made of a plastic material in order to efficiently insulate the metal layer 122, which may be exposed to or at the through-hole 126-1.

An external diameter of the first ring-type frame portion 144' may be greater than the diameter of the through-hole 126, and the internal diameter of the first ring-type frame portion 144' may be smaller than the diameter of the through-hole 126, in order to efficiently insulate the metal layer 122.

Accordingly, the insulating member 140' may be stably inserted into the through-hole 126-1 to surround the through-hole 126-1 with an appropriate range, e.g., to a suitable extent, to insulate the metal layer 122. Thus, a desired insulation effect of the metal layer may be achieved.

In an implementation, the external diameter of the first ring-type frame portion 144' may be greater than the diameter of the through-hole 126-1, and the insulating member 140' may surround the through-hole 126-1 with a wider range or to a greater extent. A degree to which the internal diameter of the first ring-type frame portion 144' is smaller than the diameter of the through-hole 126-1, as shown in FIG. 10, may be determined based on a thickness of the wall portion 142'.

The first ring-type frame portion 144' may be identically applied to the second ring-type frame portion 146, and a repeated description of the configuration of the second ring-type frame portion 146' may be omitted. In an implementation, the first and second ring-type frame portions 144' and 146' may be symmetric., e.g., geometrically symmetric, to each other. For example, the first and second ring-type frame portions 144' and 146' may be symmetric to one another with respect to a plane passing parallel to and between the first and second ring-type frame portions 144' and 146'.

Accordingly, it is possible to help improve the reliability of insulation of the metal layer of the outer case in the battery cell 100' according to this embodiment.

In an implementation, the pitches of the through-hole 126-1 of the wing portion 126 and the hole 131' of the insulating film 130' and the insulating member 140' may all be determined in the process of forming the battery cell. Accordingly, it is possible to facilitate the quality management of the battery cell by ensuring a stable structure in which the battery cell is installed in the electronic device.

By way of summation and review, a pouch-type secondary battery may be manufactured by accommodating an electrode assembly within a pouch outer case and sealing the pouch outer case. Thus, the pouch-type secondary battery may have enhanced battery capacity, as compared with a prismatic or cylindrical secondary battery manufactured by accommodating an electrode assembly, using a can made of a metal material.

The embodiments may provide a battery cell for an electronic device that may facilitate quality management by ensuring a stable structure for installing the battery cell in the electronic device, and may help improve the reliability of insulation for an outer case of the battery cell.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery cell for an electronic device, the battery cell comprising:
    an electrode assembly;
    an outer case accommodating the electrode assembly, the outer case including first and second outer cases that contact each other along edges thereof, wherein the first and second outer cases include:
    a body portion that includes a space for accommodating the electrode assembly therein, and
    a wing portion on at least a part of an outer circumference of the body portion, the wing portion including at least one through-hole therein;
    an insulating film is folded along a length direction of the wing portion to surround the wing portion, the insulating film including a hole at a position overlying the at least one through-hole of the wing portion; and
    a plate-shaped ring-type insulating member continuously extending around a circumference of the at least one through-hole,
    wherein electrode tabs of the electrode assembly for connecting to the electronic device are separate from the wing portion and extend through a side of the outer case that is orthogonal to the wing portion.

2. The battery cell as claimed in claim 1, wherein the battery cell is installable in the electronic device by a fastener that is fastened to an internal frame of the electronic device and that passes through the plate-shaped ring-type insulating member, the hole of the insulating film, and the at least one through-hole.

3. The battery cell as claimed in claim 1, wherein the insulating film surrounds the wing portion in a state in which the hole in the insulating film is formed, and a diameter of the hole in the insulating film is smaller than that of the at least one through-hole to thereby seal an inner circumferential surface of the at least one through-hole.

4. The battery cell as claimed in claim 1, wherein the at least one through-hole in the wing portion, the hole in the insulating film, and the plate-shaped ring-type insulating member have any one of a circular shape or a polygonal shape.

5. The battery cell as claimed in claim 4, wherein:
    the at least one through-hole in the wing portion, the hole in the insulating film, and the plate-shaped ring-type insulating member have the circular shape, and
    an external diameter of the plate-shaped ring-type insulating member is greater than a diameter of the at least one through-hole.

6. The battery cell as claimed in claim 5, wherein an internal diameter of the plate-shaped ring-type insulating member is smaller than the diameter of the at least one through-hole.

7. The battery cell as claimed in claim 1 wherein the insulating member is made of a plastic material.

8. The battery cell as claimed in claim 2, wherein the fastener is a bolt made of a plastic material.

9. A battery cell for an electronic device, the battery cell comprising:
    an electrode assembly;
    an outer case accommodating the electrode assembly, the outer case including first and second outer cases that contact each other along edges thereof, wherein the first and second outer cases include:
    a body portion that includes a space for accommodating the electrode assembly therein, and
    a wing portion on at least a part of an outer circumference of the body portion, the wing portion including at least one wing portion through hole therein;
    an insulating film is folded along a length direction of the wing portion to surround an inner circumferential surface of the at least one wing portion through-hole, the insulating film including at least one insulating film through-hole extending completely therethrough and coinciding with the at least one wing portion through-hole;
    a ring-type insulating member continuously extending around a circumference of the at least one through-hole;
    wherein electrode tabs of the electrode assembly for connecting to the electronic device are separate from the wing portion and extend through a side of the outer case that is orthogonal to the wing portion.

10. The battery cell as claimed in claim 9, wherein the battery cell is installable in the electronic device by a fastener that is fastened to an internal frame of the electronic device and that passes through the at least one wing portion through-hole.

11. The battery cell as claimed in claim 9, wherein the insulating film includes:
    a wall portion on the inner circumferential surface of the at least one wing portion through-hole, inner circumferential surfaces of the wall portion in the at least one insulating member through-hole; and
    a first ring-type frame portion extending from the wall portion, the first ring-type frame portion being on one outer surface of the wing portion.

12. The battery cell as claimed in claim 11, wherein the insulating film further includes a second ring-type frame portion extending from the wall portion, the second ring-type frame portion being on another outer surface of the wing portion.

13. The battery cell as claimed in claim 12, wherein the at least one wing portion through-hole, the first ring-type frame portion, and the second ring-type frame portion have any one of a circular shape or a polygonal shape.

14. The battery cell as claimed in claim 13, wherein:
    the at least one wing portion through-hole, the first ring-type frame portion, and the second ring-type frame portion have the circular shape, and
    an external diameter of the first or second ring-type frame portion is greater than a diameter of the at least one wing portion through-hole.

15. The battery cell as claimed in claim 14, wherein an internal diameter of the first or second ring-type frame portion is smaller than the diameter of the at least one wing portion through-hole.

16. The battery cell as claimed in claim 13, wherein the first ring-type frame portion is symmetric to the second ring-type frame portion.

17. The battery cell as claimed in claim 11, wherein the fastener passes through the hole in the insulating film and the at least one wing portion through-hole.

18. An electronic device, comprising:
the battery cell as claimed in claim 1;
an internal frame; and
a fastener,
wherein the battery cell is coupled with the internal frame by the fastener that is on the internal frame of the electronic device and that passes through the plate-shaped ring-type insulating member, the hole of the insulating film, and the at least one through-hole.

19. An electronic device, comprising:
the battery cell as claimed in claim 9;
an internal frame; and
a fastener,
wherein the battery cell is coupled with the internal frame by the fastener that is on the internal frame of the electronic device and that passes through the at least one wing portion through-hole.

* * * * *